(12) United States Patent
Watanabe et al.

(10) Patent No.: US 11,054,022 B2
(45) Date of Patent: Jul. 6, 2021

(54) SHIFT DEVICE

(71) Applicant: KABUSHIKI KAISHA TOKAI-RIKA-DENKI-SEISAKUSHO, Aichi-ken (JP)

(72) Inventors: Hironori Watanabe, Aichi-ken (JP); Tatsuya Onzawa, Aichi-ken (JP)

(73) Assignee: KABUSHIKI KAISHATOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 16/834,550

(22) Filed: Mar. 30, 2020

(65) Prior Publication Data
US 2020/0325982 A1 Oct. 15, 2020

(30) Foreign Application Priority Data
Apr. 10, 2019 (JP) .............................. JP2019-074993

(51) Int. Cl.
*F16H 59/08* (2006.01)
(52) U.S. Cl.
CPC .................................. *F16H 59/08* (2013.01)
(58) Field of Classification Search
CPC ............. F16H 59/08; F16H 2059/0295; F16H 2059/081; F16H 59/10
See application file for complete search history.

(56) References Cited

U.S. PATENT DOCUMENTS

| 2014/0352476 | A1* | 12/2014 | Kim | ..................... | F16H 59/02 |
| | | | | | 74/473.21 |
| 2015/0167827 | A1* | 6/2015 | Fett | ..................... | F16H 59/0278 |
| | | | | | 74/473.3 |
| 2016/0245403 | A1 | 8/2016 | Rake et al. | | |
| 2017/0074391 | A1* | 3/2017 | Tebbe | ..................... | F16H 59/08 |

FOREIGN PATENT DOCUMENTS

JP 2016-537232 A 12/2016

* cited by examiner

*Primary Examiner* — Thomas C Diaz
(74) *Attorney, Agent, or Firm* — Roberts Calderon Safran & Cole, P.C.

(57) ABSTRACT

In a shift device, when a first rotor cam is rotated in a reverse direction, recessed portions in the first rotor cam are engaged with protruding portions on a second rotor cam, and after a lever is moved rotationally, an engagement between the recessed portions and the protruding portions is released. So, when the first rotor cam is rotated in the reverse direction, not only can the recessed portions and the protruding portions be engaged with each other, but also the engagement between the recessed portions and the protruding portions can also be released.

8 Claims, 4 Drawing Sheets

SHIFT DEVICE

CROSS-REFERENCE TO RELATED APPLICATION

This application claims priority under 35 USC 119 from Japanese Patent Application No. 2019-074993 filed on Apr. 10, 2019, the disclosure of which is incorporated by reference herein.

BACKGROUND

Technical Field

The present disclosure relates to a shift device whose shift position is changed as a result of a shift body being moved.

Related Art

In a shift device described in PCT National Publication (JP-A) No. 2016-537232, when an adjustment link is rotated in reverse from its initial position, a nose of the adjustment link is engaged with a stopper element of an operating element so that the operating element is rotated in reverse.

Here, in this shift device, after the operating element has been rotated in reverse, by the adjustment link being rotated forward, the engagement of the nose with the stopper element is released so that the adjustment link is returned to its initial position.

SUMMARY

The present disclosure is conceived in view of the above-described circumstances and provides a shift device that, when a moving body is moved to one side, enables a shift body and the moving body to be engaged, and also enables an engagement between the shift body and the moving body to be released.

A shift device of a first aspect of the present disclosure includes: a shift body that is movable to change a shift position of the shift body; and a moving body that, when moved toward one side, engages with the shift body whereby the shift body is moved, and engagement of the moving body with the shift body is thereafter released.

In a shift device of a second aspect of the present disclosure, in the shift device of the first aspect of the present disclosure, the shift body and the moving body are engaged by an urging force.

In a shift device of a third aspect of the present disclosure, in the shift device of the first aspect or the second aspect of the present disclosure, the engagement of the moving body with the shift body is released due to movement of the shift body being stopped.

In a shift device of a fourth aspect of the present disclosure, in the shift device of any one of the first aspect through the third aspect of the present disclosure, the moving body is rotatable.

In a shift device of a fifth aspect of the present disclosure, in the shift device of any one of the first aspect through the fourth aspect of the present disclosure, the shift device further includes an urging mechanism that urges the shift body toward a side of the shift position, wherein the urging mechanism provides the urging force that engages the shift body and the moving body.

In a shift device of a sixth aspect of the present disclosure, in the shift device of the fifth aspect of the present disclosure, the shift body and the moving body are engaged by the urging force of the urging mechanism, and due thereto, the urging force of the urging mechanism is reduced.

In a shift device of a seventh aspect of the present disclosure, in the shift device of any one of the first aspect through the sixth aspect of the present disclosure, in a case in which the moving body is moved toward the one side, the moving body engages with the shift body and the shift body is moved toward the one side so as to be positioned at a predetermined shift position; and in a case in which the moving body is moved toward the one side from a state in which the shift body is positioned at the predetermined shift position, the engagement of the moving body with the shift body is released due to movement of the shift body toward the one side being restricted.

In a shift device of an eighth aspect of the present disclosure, in the shift device of any one of the first aspect through the seventh aspect of the present disclosure, the shift device further includes: a restricting section that restricts movement of the shift body, the movement of the shift body being restricted due to the shift body being engaged with the restricting section; an engaging portion that is provided at one of the shift body or the moving body; and an engaged portion that is provided at another of the shift body or the moving body, the shift body being configured to move integrally with the moving body due to the engaging portion and the engaged portion being engaged, wherein: in the case in which the moving body is moved toward the one side, the shift body is moved toward the one side so as to be positioned at the predetermined shift position, due to the shift body being moved integrally with the moving body as a result of the engaging portion and the engaged portion being engaged, and; in the case in which the moving body is moved toward the one side from the state in which the shift body is positioned at the predetermined shift position, the engagement of the moving body with the shift body is released due to the restricting section restricting the movement of the shift body toward the one side as a result of the shift body being engaged with the restricting section.

In the shift device of the first, the seventh and the eighth aspects of the present disclosure, the shift position is changed as a result of the shift body being moved. In addition, when the moving body is moved to the one side, the shift body and the moving body become engaged with each other so that the shift body is moved.

Here, when the moving body is moved to the one side, after the shift body and the moving body are engaged with each other and the shift body is moved, the engagement of the moving body and the shift body is released. Due thereto, when the moving body is moved to the one side, the shift body and the moving body can be engaged with each other, and the engagement of the moving body and the shift body can also be released.

In the shift device of the second aspect of the present disclosure, the shift body and the moving body are made to engage with each other by urging force. Due thereto, the shift body and the moving body can be made to engage with each other with a simple structure.

In the shift device of the third aspect of the present disclosure, the engagement between the shift body and the moving body is released due to the movement of the shift body being stopped. Due thereto, the engagement between the shift body and the moving body can be released with a simple structure.

In the shift device of the fourth aspect of the present disclosure, the moving body is rotatable (configured to rotate). Due thereto, even if the moving body is not rotated to the other side, the moving body can be restored to its initial rotation position by the moving body being rotated to the one side.

In the shift device of the fifth aspect of the present disclosure, the urging mechanism urges the shift body towards the shift position side.

Here, the shift body and the moving body are made to engage with each other by urging force of the urging mechanism. Due thereto, the shift body and the moving body can be made to engage with each with a simple structure.

In the shift device of the sixth aspect of the present disclosure, the shift body and the moving body are made to engage with each other by urging force of the urging mechanism, and the urging force of the urging mechanism is then reduced. Due thereto, when the shift body and the moving body are engaged with each other and the shift body is moved, the movement resistance force of the shift body by the urging force of the urging mechanism is reduced.

BRIEF DESCRIPTION OF THE DRAWINGS

An exemplary embodiment of the present disclosure will be described in detail based on the following figures, wherein.

DETAILED DESCRIPTION

Figure 1:
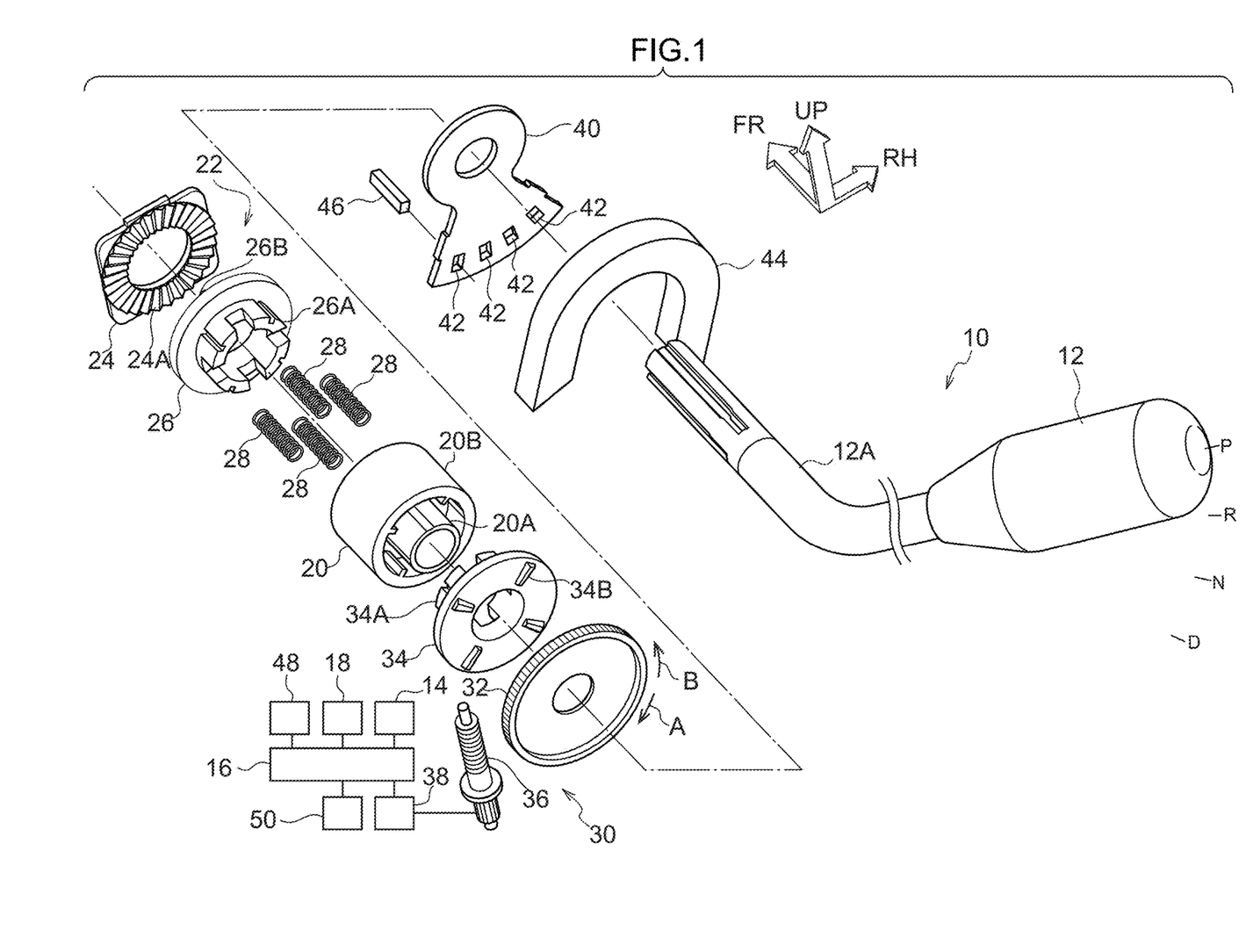
FIG. 1 is an exploded perspective view as seen from a direction diagonally above and to the rear showing a shift device according to an exemplary embodiment of the present disclosure.
Figure 2:
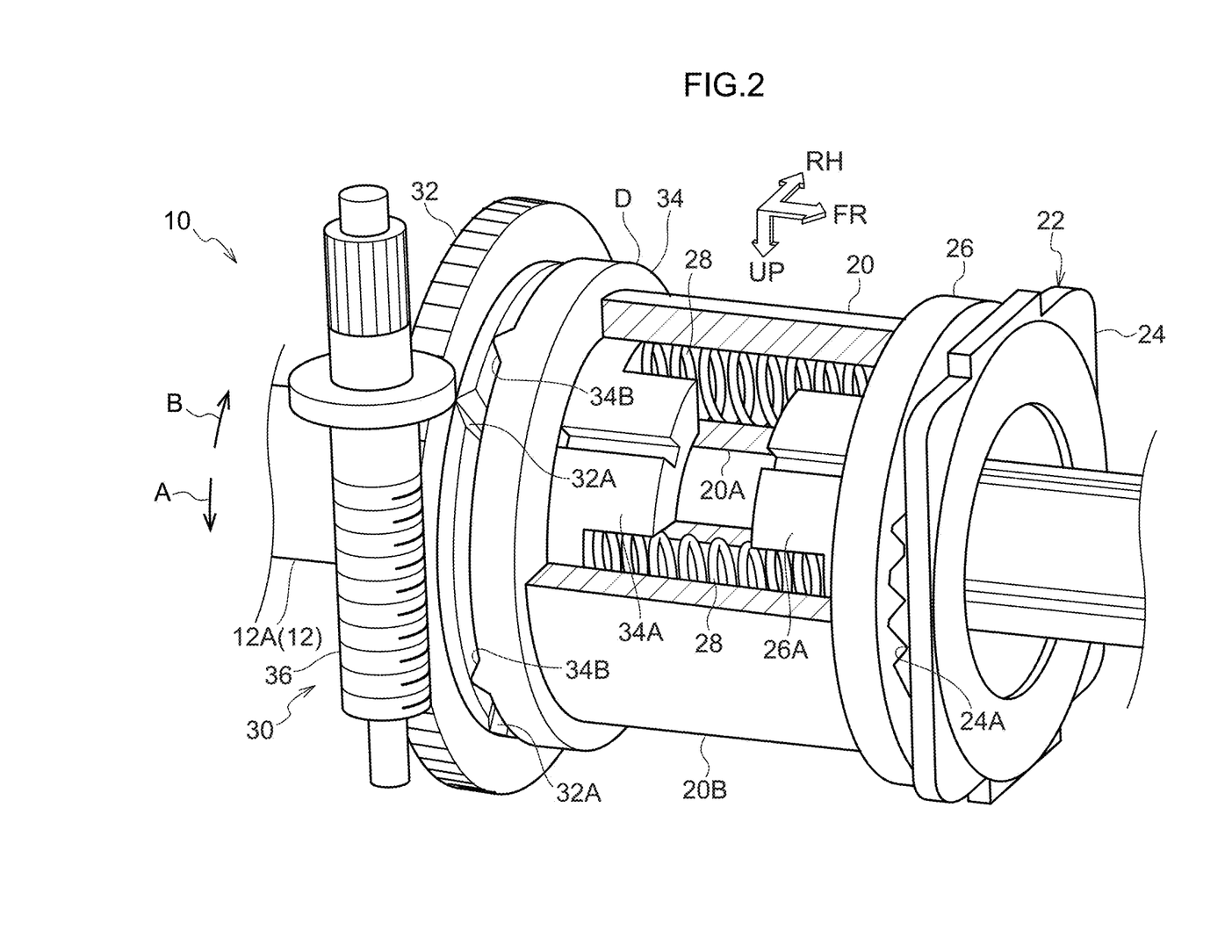
FIG. 2 is a perspective view as seen from a direction diagonally downwards and to the left side showing the shift device according to the exemplary embodiment of the present disclosure.

A shift device 10 according to an exemplary embodiment of the present disclosure is shown in an exploded perspective view as seen from a direction diagonally above and to the rear in FIG. 1, while the shift device 10 is shown in a perspective view as seen from a direction diagonally downwards and to the left side in FIG. 2. Note that an arrow FR, an arrow RH, and an arrow UP that are shown in the drawings respectively indicate a forward direction of the shift device 10, a right-side direction of the shift device 10, and an upper side of the shift device 10.

The shift device 10 according to the present exemplary embodiment is disposed in a steering column of a vehicle, and a front direction, a right-side direction, and an upward direction of the shift device 10 refer respectively to a direction diagonally downward and to the front, a direction to the right-side, and a direction diagonally upwards and to the front of a vehicle.

As is shown in FIG. 1 and FIG. 2, a rod-shaped lever 12 having a circular cross-section which serves as an operating body structuring a shift body is provided in the shift device 10. A base-end portion 12A (i.e., a front-end portion) of the lever 12 is rotatably supported on the steering column. The base-end portion 12A of the lever 12 is disposed in parallel with a front-rear direction, and movement of the base-end portion 12A of the lever 12 is restricted in an axial direction (i.e., in a front-rear direction) and a radial direction thereof. A distal-end side portion (i.e., a portion other than the base-end portion thereof) of the lever 12 extends in a direction in which it approaches closer to the right side (the left side is also permissible) the further it is towards the rear. The lever 12 is such that the base-end portion 12A is configured to be rotated around a central axis, and is capable of being moved rotationally (i.e., moved) in a forward direction (i.e., towards a lower side, in a direction shown by an arrow A in the drawings) and in a reverse direction thereto (i.e., towards an upper side, in a direction shown by an arrow B in the drawings).

A distal-end portion (i.e., a rear-end portion) of the lever 12 extends into the vehicle cabin and is capable of being moved rotationally. The lever 12 can be operated so as to perform a rotational movement in a state in which the distal-end portion of the lever 12 is gripped by an occupant (in particular, by a driver) of the vehicle. As a result of the lever 12 being moved rotationally from the reverse direction side towards the forward direction side, the shift position of the lever 12 is changed, for example, to a 'P' position (i.e., a parking position; a predetermined position), an 'R' position (i.e., a reverse position), an 'N' position (i.e., a neutral position), and a 'D' position (i.e., a drive position) in that sequence. Furthermore, rotation angles between each shift position of the lever 12 are the same.

A rear-end portion of the base-end portion 12A of the lever 12 is inserted through an upper portion of a substantially plate (flat) shaped and fan-shaped restricting plate 40 which serves as a restricted portion, structuring the shift body (the base-end portion 12A of the lever 12 is fixed to the restricting plate 40 in a rotational direction thereof). The restricting plate 40 is moved rotationally in left-right directions integrally with the rotational movement of the lever 12 (i.e., with the rotation of the base-end portion 12A). Plural (four in the present exemplary embodiment) rectangular restricting holes 42 are formed so as to penetrate a lower portion of the restricting plate 40, and the plural restricting holes 42 are located equidistantly in a circumferential direction of rotational movement of the restricting plate 40.

Figure 4A:
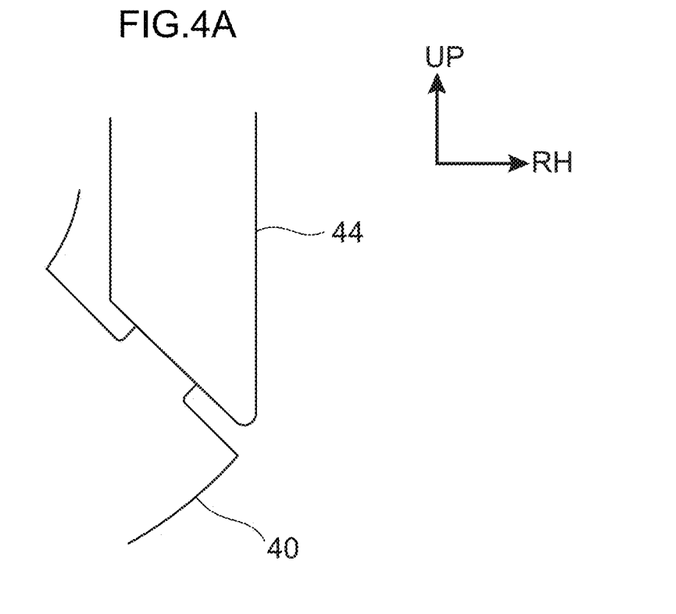
FIGS. 4A and 4B are simplified views showing a movement of a shift body being restricted by a restricting section in the shift device according to the exemplary embodiment of the present disclosure.

A U-frame shaped restricting block 44 which serves as a restricting portion (restricting section) is disposed around the restricting plate 40. Movement of the restricting block in the front-rear directions, left-right directions, and up-down directions is restricted. The interior of the restricting block 44 is open via a lower side thereof, and the lower portion of the restricting plate 40 is disposed between a left-side end and a right-side end of the restricting block 44. When the lever 12 is moved rotationally to the 'P' position (so as to positioned at the 'P' position), the restricting plate 40 abuts against the right-side end of the restricting block 44 (FIG. 4A) so that a rotational movement of the lever 12 in the reverse direction is restricted (blocked). Furthermore, when the lever 12 is moved rotationally to the 'D' position (so as to positioned at the 'D' position), the restricting plate 40 abuts against the left-side end of the restricting block 44 so that a rotational movement of the lever 12 in the forward direction is restricted (blocked). Because of this, the possible range of rotational movement of the lever 12 is restricted to a range between the 'P' position and the 'D' position.

Figure 4B:
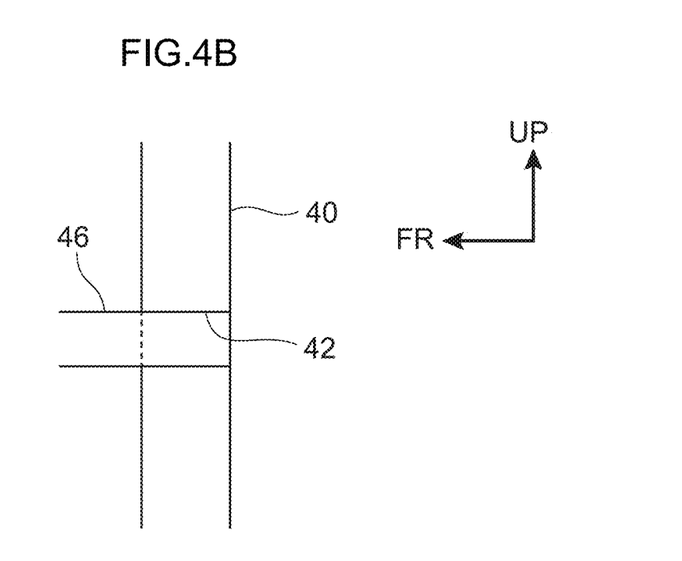

A rectangular-column shaped blocker 46 which serves as a restricting member (restricting section) is disposed at a front side of the lower portion of the restricting plate 40. The blocker 46 is able to move in the front-rear directions (i.e., in an axial direction thereof), however, movement thereof in the left-right directions and up-down directions is restricted. An operating mechanism 48 is mechanically connected to the blocker 46, and this operating mechanism 48 is electrically connected to a control device 16 of the vehicle. The operating mechanism 48 is operated by control performed by the control device 16 resulting in the blocker 46 being moved towards the rear. When the lever 12 is positioned in the respective shift positions, the restricting holes 42 in the restricting plate 40 are located to the rear of the blocker 46. Due thereto, when the lever 12 has been positioned in each shift position, as a result of the operating mechanism 48 being operated and the blocker 46 accordingly being moved towards the rear, the blocker 46 is inserted into (i.e., fitted inside) the restricting hole 42 (FIG. 4B) so that rotational movement of the restricting plate 40 and the lever 12 is restricted (i.e., locked (blocked)).

A detection device 14 is provided in the shift device 10. The detection device 14 detects a rotational movement (rotation) position of the lever 12 (for example, the rotational position of the base-end portion 12A), and thereby detects the shift position of the lever 12. The detection device 14 is electrically connected to the control device 16, and an automatic transmission 18 (i.e., a transmission) of the vehicle is also electrically connected to the control device 16. When the lever 12 is moved rotationally so that the shift position of the lever 12 is changed (i.e., when the change of the shift position of the lever 12 is detected by the detection device 14), then the shift range of the automatic transmission 18 is changed by control performed by the control device 16 to a shift range that corresponds to the shift position of the lever 12.

The base-end portion 12A of the lever 12 is inserted into a substantially circular-cylinder shaped connecting (communication) cylinder 20, which serves as a connecting (communication) body structuring the shift body, so as to be coaxial therewith. The connecting cylinder 20 is fixed to the base-end portion 12A of the lever 12 and is thereby able to rotationally move integrally with the base-end portion 12A of the lever 12. A substantially circular-cylinder shaped inner cylinder 20A is provided on an inner side in a radial direction of the connecting cylinder 20, and a substantially circular-cylinder shaped outer cylinder 20B is provided on an outer side in the radial direction of the connecting cylinder 20. The inner cylinder 20A and the outer cylinder 20B are disposed coaxially with each other, and are joined together at predetermined positions in a circumferential direction thereof so as to be able to rotate integrally with each other.

A detent mechanism 22 which serves as an urging mechanism is provided at a front side of the connecting cylinder 20.

A substantially rectangular-plate shaped detent plate 24 which serves as a holding body is provided in the detent mechanism 22. The base-end portion 12A of the lever 12 penetrates (is inserted through) the detent plate 24 so as to be coaxial therewith and so as to be able to rotate, and movement of the detent plate 24 is restricted in the front-rear directions, the left-right directions, and the up-down directions. Plural urging recessed portions 24A which serve as urging portion and have a substantially triangular cross-section are formed on a rear surface of the detent plate 24. The urging recessed portions 24A extend in the radial direction of the detent plate 24 (i.e., in the radial direction of the base-end portion 12A of the lever 12). The plural urging recessed portions 24A are located equidistantly in the circumferential direction of the detent plate 24, and a location interval angle between mutually adjacent urging recessed portions 24A is substantially the same as the rotation angle between shift positions of the lever 12.

A substantially annular-plate shaped urging plate 26 which serves as an urging body is provided at a rear side of the detent plate 24. The base-end portion 12A of the lever 12 penetrates (is inserted through) the urging plate 26 so as to be coaxial therewith. A substantially circular-cylinder shaped urging cylinder 26A is formed integrally with a rear surface of the urging plate 26 and so as to be coaxial therewith, and the urging cylinder 26A is inserted between the inner cylinder 20A and the outer cylinder 20B of the connecting cylinder 20 so as to be coaxial therewith. Movement in a radial direction of the urging plate 26 is restricted by the connecting cylinder 20, however, the urging plate 26 is able to rotate integrally with the connecting cylinder 20 and is also able to move in the front-rear directions (i.e., in the axial direction thereof) relative to the connecting cylinder 20.

Plural (six in the present exemplary embodiment) substantially triangular-column shaped urging protrusions 26B which serve as urged portion are formed integrally with a front surface of the urging plate 26, and these urging protrusions 26B protrude towards the front side. The urging protrusions 26B extend in the radial direction of the urging plate 26, and the plural urging protrusions 26B are located equidistantly in the circumferential direction of the urging plate 26.

Plural (four in the present exemplary embodiment) detent springs 28 (i.e., compression coil springs) which serve as urging member are provided at a rear side of the urging plate 26. The plural detent springs 28 are inserted respectively between the inner cylinder 20A and the outer cylinder 20B of the connecting cylinder 20, and are located equidistantly in the circumferential direction of the connecting cylinder 20. The detent springs 28 are abutted against the urging cylinder 26A of the urging plate 26, and the detent springs 28 urge the urging plate 26 towards the front side.

When the lever 12 is positioned in each shift position, the urging protrusions 26B of the urging plate 26 are inserted by urging force of the detent springs 28 into the urging recessed portions 24A of the detent plate 24, and consequently fit to (mesh with) the urging recessed portions 24A in the circumferential direction of the urging plate 26. As a result, the rotation position of the urging plate 26 is held, therefore the rotation position of the connecting cylinder 20 is held, as a result, the lever 12 is held in each shift position. When the lever 12 is moved rotationally so that the shift position of the lever 12 is changed, the urging plate 26 is moved towards the rear side while resisting the urging force from the detent springs 28, so the urging protrusions 26B separate from the one urging recessed portions 24A, thereafter, the urging plate 26 is moved towards the front side by the urging force from the detent springs 28, and each urging protrusion 26B is inserted into another urging recessed portion 24A located next (adjacent) to the one urging recessed portion 24A.

A drive mechanism 30 which serves as a movement mechanism is provided at a rear side of the connecting cylinder 20.

An annular-plate shaped first rotor cam 32 (i.e., a worm wheel) which serves as a moving body is provided in the drive mechanism 30, and the base-end portion 12A of the lever 12 penetrates (is inserted through) the first rotor cam 32 so as to be coaxial therewith. The first rotor cam 32 is rotatably supported on the base-end portion 12A of the lever 12, and the movement in the axial direction (i.e., front-rear direction) and in the radial direction of the first rotor cam 32 is restricted. A predetermined number (four in the present exemplary embodiment) of recessed portions 32A which have a substantially triangular cross-section and serve as engaging portion are formed on a front surface of the first rotor cam 32. The predetermined number of recessed portions 32A extend respectively in radial direction of the first rotor cam 32, and are located equidistantly in the circumferential direction of the first rotor cam 32. A predetermined number (four in the present exemplary embodiment) of reference rotation positions (reference positions) are set equidistantly in the circumferential direction in the first rotor cam 32, and the first rotor cam 32 is positioned at each of these reference rotation positions by being rotated.

A rotation detection device 50 which serves as a movement detection mechanism is provided in the drive mechanism 30. The rotation detection device 50 detects rotation positions of the first rotor cam 32, and is electrically connected to the control device 16.

A substantially annular-plate shaped second rotor cam 34 which serves as a connecting (interlock) body structuring the shift body is provided at a front side of the first rotor cam 32. The base end portion 12A of the lever 12 penetrates (is inserted through) the second rotor cam 34 so as to be coaxial therewith. A substantially circular-cylinder shaped connecting cylinder 34A is formed integrally with a front surface of the second rotor cam 34 so as to be coaxial therewith. The connecting cylinder 34A is inserted between the inner cylinder 20A and the outer cylinder 20B of the connecting cylinder 20 so as to be coaxial therewith. Movement in the radial direction of the second rotor cam 34 is restricted by the connecting cylinder 20, and the second rotor cam 34 is able to rotate integrally with the connecting cylinder 20, and is also able to move in the front-rear direction (i.e., in the axial direction) relative to the connecting cylinder 20.

A predetermined number (four in the present exemplary embodiment) of substantially triangular-column shaped protruding portions 34B which serve as engaged portion are formed integrally with a rear surface of the second rotor cam 34. These protruding portions 34B protrude towards the rear side. The protruding portions 34B extend in the radial direction of the second rotor cam 34, and the predetermined number of protruding portions 34B are located equidistantly in the circumferential direction of the second rotor cam 34.

Figure 3A:
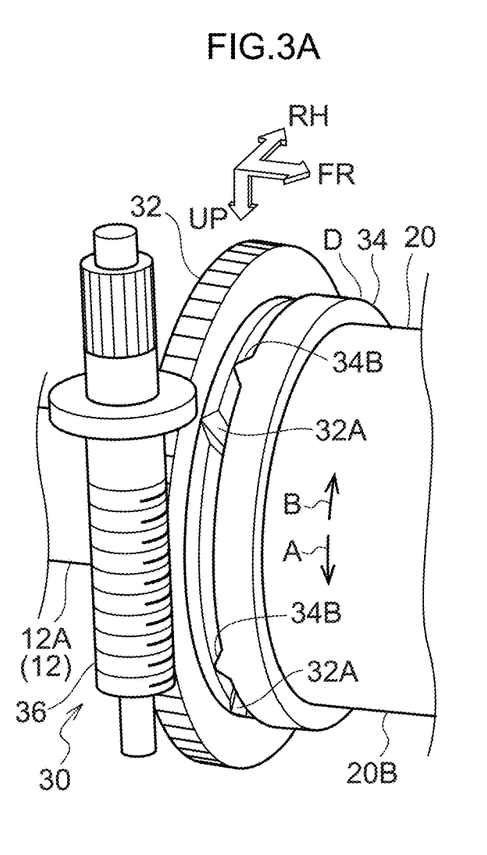
FIGS. 3A through 3C are perspective views as seen from a direction diagonally downwards and to the left side showing principal portions of the shift device according to the exemplary embodiment of the present disclosure, with 3A showing a state when a lever is in a 'D' position, 3B showing a state when a first rotor cam is rotated, and 3C showing a state when the lever is in a 'P' position.
Figure 3B:
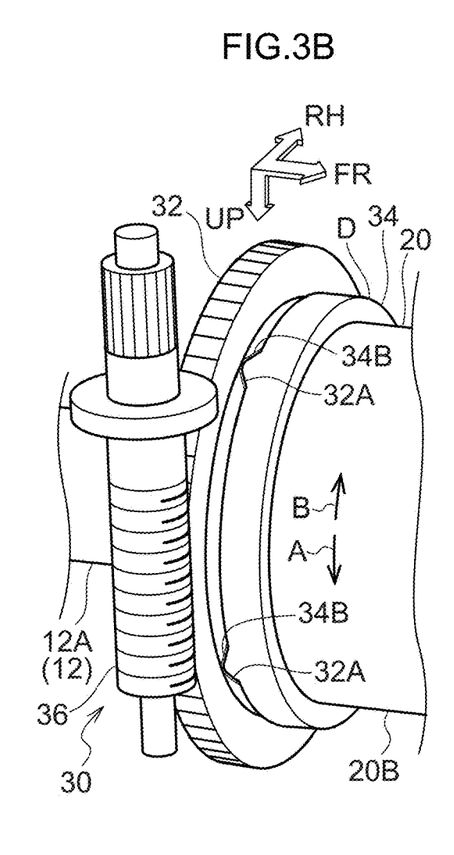
Figure 3C:
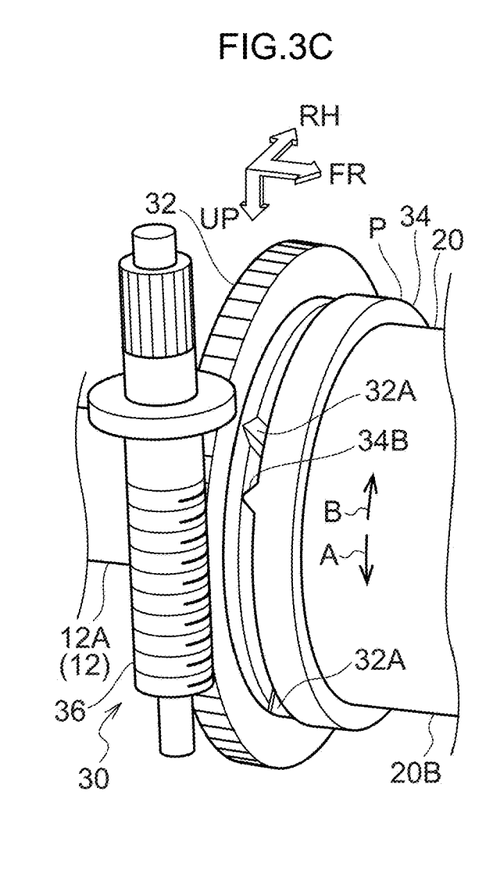

The detent springs 28 of the detent mechanism 22 abut against the connecting cylinder 34A of the second rotor cam 34. The detent springs 28 urge the second rotor cam 34 towards the rear side, and consequently cause the protruding portions 34B of the second rotor cam 34 to abut against the front surface of the first rotor cam 32. When the lever 12 is moved rotationally within a range from the 'P' position to the 'D' position, the protruding portions 34B are rotated within a range between the recessed portions 32A in the front surface of the first rotor cam 32 (see FIG. 3A and FIG. 3C).

A worm 36 which serves as a transmission member meshes with the first rotor cam 32, and this worm 36 restricts the rotation of the first rotor cam 32. A motor 38 which serves as a drive device is mechanically connected to the worm 36, and this motor 38 is electrically connected to the control device 16. The motor 38 can be driven by control performed by the control device 16. When the motor 38 is driven, the worm 36 is made to rotate, and this causes the first rotor cam 32 to be rotated.

Next, operation of the present exemplary embodiment will be described.

In the shift device 10 having the above-described structure, when the lever 12 is moved rotationally in the forward direction and in the reverse direction so that the shift position of the lever 12 is changed, the connecting cylinder 20 is rotated integrally with the base-end portion 12A of the lever 12. Due thereto, in the detent mechanism 22, as a result of the urging plate 26 rotating integrally with the connecting cylinder 20, the urging protrusions 26B of the urging plate 26 separate from the one urging recessed portions 24A of the detent plate 24 while resisting the urging force from the detent springs 28, thereafter, each urging protrusion 26B is inserted by the urging force from the detent springs 28 into the another urging recessed portion 24A which is located next (adjacent) to the one urging recessed portion 24A. As a result, after rotation resistance force has applied on the rotational movement operation of the lever 12, rotation auxiliary force is made to be applied thereon, so that a detent feeling is applied to the rotational movement operation of the lever 12. Moreover, the shift range of the automatic transmission 18 is changed by control performed by the control device 16 to a shift range that corresponds to the shift portion of the lever 12.

If predetermined circumstance (for example, if the engine of a vehicle is stopped) occurs when the lever 12 is positioned in a position other than the 'P' position (for example, in the 'D' position), then the shift range of the automatic transmission 18 is automatically changed by control performed by the control device 16 to the 'P' range (i.e. to the parking range).

If the predetermined circumstance (see FIG. 3A) occurs when the lever 12 is positioned in a position other than the 'P' position, then in the drive mechanism 30, the motor 38 is driven by control performed by the control device 16 so that the worm 36 is rotated. This causes the first rotor cam 32 to be rotated from the reference rotation position in the reverse direction, and causes the protruding portions 34B of the second rotor cam 34 to be inserted into (i.e., engaged with) the recessed portions 32A in the first rotor cam 32 due to the urging force of the detent springs 28 (see FIG. 3B). This engaging force of the recessed portions 32A and the protruding portions 34B is larger than the engaging force of the urging protrusions 26B of the urging plate 26 and the urging recessed portions 24A of the detent plate 24. Due thereto, while the urging protrusions 26B are being separated from the urging recessed portions 24A with resisting the urging force from the detent springs 28 and are being inserted into the urging recessed portions 24A by the urging force of the detent springs 28, the second rotor cam 34, the connecting cylinder 20, the urging plate 26, and the base-end portion 12A of the lever 12 are rotated in the reverse direction by the first rotor cam 32. As a result, the lever 12 is moved rotationally to and positioned in the 'P' position, and the shift position of the lever 12 is made to correspond to the shift range of the automatic transmission 18.

Furthermore, when the shift lever 12 has been moved rotationally to and positioned in the 'P' position, the restricting plate 40 of the lever 12 is abutted against the right-side end of the restricting block 44 (the restricting plate 40 is engaged with (caught or stopped by) the restricting block 44) so that rotational movement in the reverse direction of the lever 12 is restricted (i.e., the lever 12 is made to be stopped in the 'P' position). As a result of this, rotation in the reverse direction of the second rotor cam 34 is restricted (blocked), and the protruding portions 34B of the second rotor cam 34 are separated (i.e., disengaged) from the recessed portions 32A of the first rotor cam 32 while resisting the urging force from the detent springs 28. When the first rotor cam 32 is rotated to and positioned in the next reference rotation position on the reverse direction side, the driving of the motor 38 is stopped by control performed by the control device 16, and the first rotor cam 32 is stopped in that reference rotation position (see FIG. 3C).

Moreover, when the vehicle is performing autonomous driving (self-driving) (for example, when the vehicle is performing autonomous parking (self-parking)), the shift range of the automatic transmission 18 is changed automatically by control performed by the control device 16, so the shift position of the lever 12 does not correspond to the shift range of the automatic transmission 18.

When the vehicle is performing autonomous driving, if the shift position of the lever 12 does not correspond to the shift range of the automatic transmission 18, then in the drive mechanism 30, the motor 38 is driven by the control of the control device 16 so that the worm 36 is rotated. As a result, the first rotor cam 32 is rotated from the reference rotation position in one direction (i.e., in the forward direction or in the reverse direction), and the protruding portions 34B of the second rotor cam 34 are inserted into the recessed portions 32A in the first rotor cam 32 by the urging force of the detent springs 28. Due thereto, while the urging protrusions 26B of the urging plate 26 are being separated from the urging recessed portions 24A in the detent plate 24 with resisting the urging force of the detent springs 28 and are being inserted into the urging recessed portions 24A by the urging force of the detent springs 28, the second rotor cam 34, the connecting cylinder 20, the urging plate 26, and the base-end portion 12A of the lever 12 are rotated in the one direction by the first rotor cam 32. As a result, the lever 12 is moved rotationally in the one direction, and the lever 12 is made to be positioned in a shift position corresponding to the shift range of the automatic transmission 18.

At the point (i.e., the instant) when the shift position of the lever 12 corresponds to the shift range of the automatic transmission 18, the operating mechanism 48 is operated by control performed by the control device 16 so as to cause the blocker 46 to be moved towards the rear. As a result, the blocker 46 is inserted into the restricting hole 42 in the restricting plate 40 of the lever 12 (the restricting plate 40 is engaged with (caught or stopped by) the blocker 46) so that rotational movement of the restricting plate 40 and the lever 12 is restricted (blocked) (i.e., the lever 12 is stopped in that shift position). Due thereto, rotation in the one direction of the second rotor cam 34 is restricted (blocked), and the protruding portions 34B of the second rotor cam 34 are separated from the recessed portions 32A of the first rotor cam 32 while resisting the urging force from the detent springs 28. When the first rotor cam 32 has been rotated to and positioned in the next reference rotation position on the one direction side, the driving of the motor 38 is stopped by control performed by the control device 16, and the first rotor cam 32 is stopped in that reference rotation position.

As is described above, immediately after the protruding portions 34B of the second rotor cam 34 have been separated from the recessed portions 32A in the first rotor cam 32, the operation of the operating mechanism 48 is released by control performed by the control device 16 so that the blocker 46 is moved towards the front. As a result, the blocker 46 is separated from the restricting hole 42 in the restricting plate 40 of the lever 12, and rotational movement of the restricting plate 40 and the lever 12 is permitted. Thereafter, when the lever 12 is rotationally operated, autonomous driving of the vehicle is forcibly ended by control performed by the control device 16.

Here, as is described above, when the first rotor cam 32 is rotated in the one direction (i.e., towards the one side), the recessed portions 32A in the first rotor cam 32 and the protruding portions 34B of the second rotor cam 34 are mutually engaged with each other, and after the lever 12 is then moved rotationally to and positioned in a predetermined shift position, the engagement between the recessed portions 32A in the first rotor cam 32 and the protruding portions 34B of the second rotor cam 34 is released. Due thereto, when the first rotor cam 32 is rotated in the one direction, not only are the recessed portions 32A in the first rotor cam 32 and the protruding portions 34B of the second rotor cam 34 able to be engaged with each other, but also the engagement between the recessed portions 32A in the first rotor cam 32 and the protruding portions 34B of the second rotor cam 34 is able to be released. As a consequence, after the lever 12 has been moved rotationally to and positioned in the predetermined shift position, it is possible to eliminate the need "by rotating the first rotor cam 32 in another direction (i.e., in the other of the forward direction or the reverse direction, namely, towards the other side), and thereby releasing the engagement between the recessed portions 32A in the first rotor cam 32 and the protruding portions 34B of the second rotor cam 34 so as to rotate (i.e., restore) the first rotor cam 32 to its original reference rotation position", thereby reduce the operating time of the drive mechanism 30 (i.e. the drive time of the motor 38).

The recessed portions 32A in the first rotor cam 32 and the protruding portions 34B of the second rotor cam 34 are made to engage with each other by urging force. Due thereto, the recessed portions 32A in the first rotor cam 32 and the protruding portions 34B of the second rotor cam 34 can be made to engage with each other via a simple structure.

Moreover, the recessed portions 32A in the first rotor cam 32 and the protruding portions 34B of the second rotor cam 34 are made to engage with each other by urging force of the detent springs 28. Due thereto, the recessed portions 32A in the first rotor cam 32 and the protruding portions 34B of the second rotor cam 34 can be made to engage with each other via an even simpler structure.

Furthermore, rotational movement of the lever 12 in the one direction is restricted (blocked), so the engagement between the recessed portions 32A in the first rotor cam 32 and the protruding portions 34B of the second rotor cam 34 is released in resistance to the urging force of the detent springs 28. Due thereto, the engagement between the recessed portions 32A in the first rotor cam 32 and the protruding portions 34B of the second rotor cam 34 can be released via a simple structure.

Moreover, the first rotor cam 32 is rotated. Due thereto, as a result of the first rotor cam 32 being rotated for one full rotation in the one direction, even if the first rotor cam 32 is not rotated in the other direction, the first rotor cam 32 can be restored to its initial rotation position. As a consequence, even if the amount the first rotor cam 32 is rotated in the one direction from its initial rotation position exceeds one full rotation, when the first rotor cam 32 is rotated in the one direction, the protruding portions 34B of the second rotor cam 34 can be made to engage with each other or to disengage from each other.

Furthermore, when the recessed portions 32A in the first rotor cam 32 and the protruding portions 34B of the second rotor cam 34 are engaged with each other and the lever 12 is moved rotationally, if external force is applied at this time to the lever 12, the engagement between the recessed portions 32A in the first rotor cam 32 and the protruding portions 34B of the second rotor cam 34 is released in resistance to the urging force of the detent springs 28, and the connection (communication) between the first rotor cam 32 and the lever 12 is released. Due thereto, it is possible to suppress the drive mechanism 30 (for example, the worm 36 or the first rotor cam 32) from becoming damaged due to the connection (communication) between the first rotor cam 32 and the lever 12 not being released.

Moreover, when the recessed portions 32A in the first rotor cam 32 and the protruding portions 34B of the second rotor cam 34 are made to engage with each other by the urging force of the detent springs 28, the second rotor cam 34 is moved towards the rear side due to the insertion of the protruding portions 34B into the recessed portions 32A, and the urging force of the detent springs 28 is reduced. Due thereto, when the recessed portions 32A and the protruding portions 34B are mutually engaged and the lever 12 is moved rotationally, it is possible to reduce the noise which is generated when the urging protrusions 26B of the urging plate 26 are inserted into the urging recessed portions 24A in the detent plate 24 by the urging force of the detent springs 28. Furthermore, it is also possible to reduce separating force (i.e., the rotation resistance force of the urging plate 26) required by the urging protrusions 26B separating from the urging recessed portions 24A with resisting the urging force of the detent springs 28. Accordingly, in the drive mechanism, it is possible to reduce the drive force of the motor 38, and to make the size of the motor 38 small. Additionally, the reduction ratio from the motor 38 to the first rotor cam 32 can be made smaller and the size of the reduction mechanism from the motor 38 to the first rotor cam 32 (for example, the worm 36 and the first rotor cam 32) can be made small.

Note that, in the present exemplary embodiment, the urging recessed portions 24A are provided in the detent plate 24, and the urging protrusions 26B are provided on the urging plate 26. However, it is also possible for the urging protrusions 26B to be provided on the detent plate 24, and for the urging recessed portions 24A to be provided in the urging plate 26.

Furthermore, in the present exemplary embodiment, the recessed portions 32A are provided in the first rotor cam 32, and the protruding portions 34B are provided on the second rotor cam 34. However, it is also possible for the protruding portions 34B to be provided on the first rotor cam 32, and for the recessed portions 32A to be provided in the second rotor cam 34.

Moreover, in the present exemplary embodiment, the first rotor cam 32 (i.e. the moving body) is rotated. However, it is also possible for the moving body to be moved rotationally or to be moved slidingly.

Furthermore, in the present exemplary embodiment, the lever 12 (i.e., the operating body) is moved rotationally. However, it is also possible for the operating body to be moved slidingly or to be rotated around a central axis thereof.

Moreover, in the present exemplary embodiment, the shift device 10 is installed in a steering column. However, it is also possible for the shift device 10 to be installed in an instrument panel or in a console.

What is claimed is:
1. A shift device comprising:
   a shift body that is movable to change a shift position of the shift body; and
   a moving body that, when moved toward one side, engages with the shift body whereby the shift body is moved, and engagement of the moving body with the shift body is thereafter released,
   wherein: in a case in which the moving body is moved toward the one side, the moving body engages with the shift body and the shift body is moved toward the one side so as to be positioned at a predetermined shift position; and in a case in which the moving body is moved toward the one side from a state in which the shift body is positioned at the predetermined shift position, the engagement of the moving body with the shift body is released due to movement of the shift body toward the one side being restricted, and further comprising:
   a restricting section that restricts movement of the shift body, the movement of the shift body being restricted due to the shift body being engaged with the restricting section;
   an engaging portion that is provided at one of the shift body or the moving body; and an engaged portion that is provided at another of the shift body or the moving body,
   the shift body being configured to move integrally with the moving body due to the engaging portion and the engaged portion being engaged, wherein:
   in the case in which the moving body is moved toward the one side, the shift body is moved toward the one side so as to be positioned at the predetermined shift position, due to the shift body being moved integrally with the moving body as a result of the engaging portion and the engaged portion being engaged, and;
   in the case in which the moving body is moved toward the one side from the state in which the shift body is positioned at the predetermined shift position, the engagement of the moving body with the shift body is released due to the restricting section restricting the movement of the shift body toward the one side as a result of the shift body being engaged with the restricting section.

2. The shift device of claim 1, wherein the shift body and the moving body are engaged by an urging force.

3. The shift device of claim 2, wherein the engagement of the moving body with the shift body is released due to movement of the shift body being stopped.

4. The shift device of claim 3, wherein the moving body is rotatable.

5. The shift device of claim 4, further comprising an urging mechanism that urges the shift body toward a side of the shift position, wherein the urging mechanism provides the urging force that engages the shift body and the moving body.

6. The shift device of claim 5, wherein the shift body and the moving body are engaged by the urging force of the urging mechanism, and due thereto, the urging force of the urging mechanism is reduced.

7. The shift device of claim 1, wherein the moving body and the shift body are rotatable.

8. The shift device of claim 7, wherein the engaging portion and the engaged portion are engaged by an urging force of an urging mechanism.

* * * * *